United States Patent Office 3,555,074
Patented Jan. 12, 1971

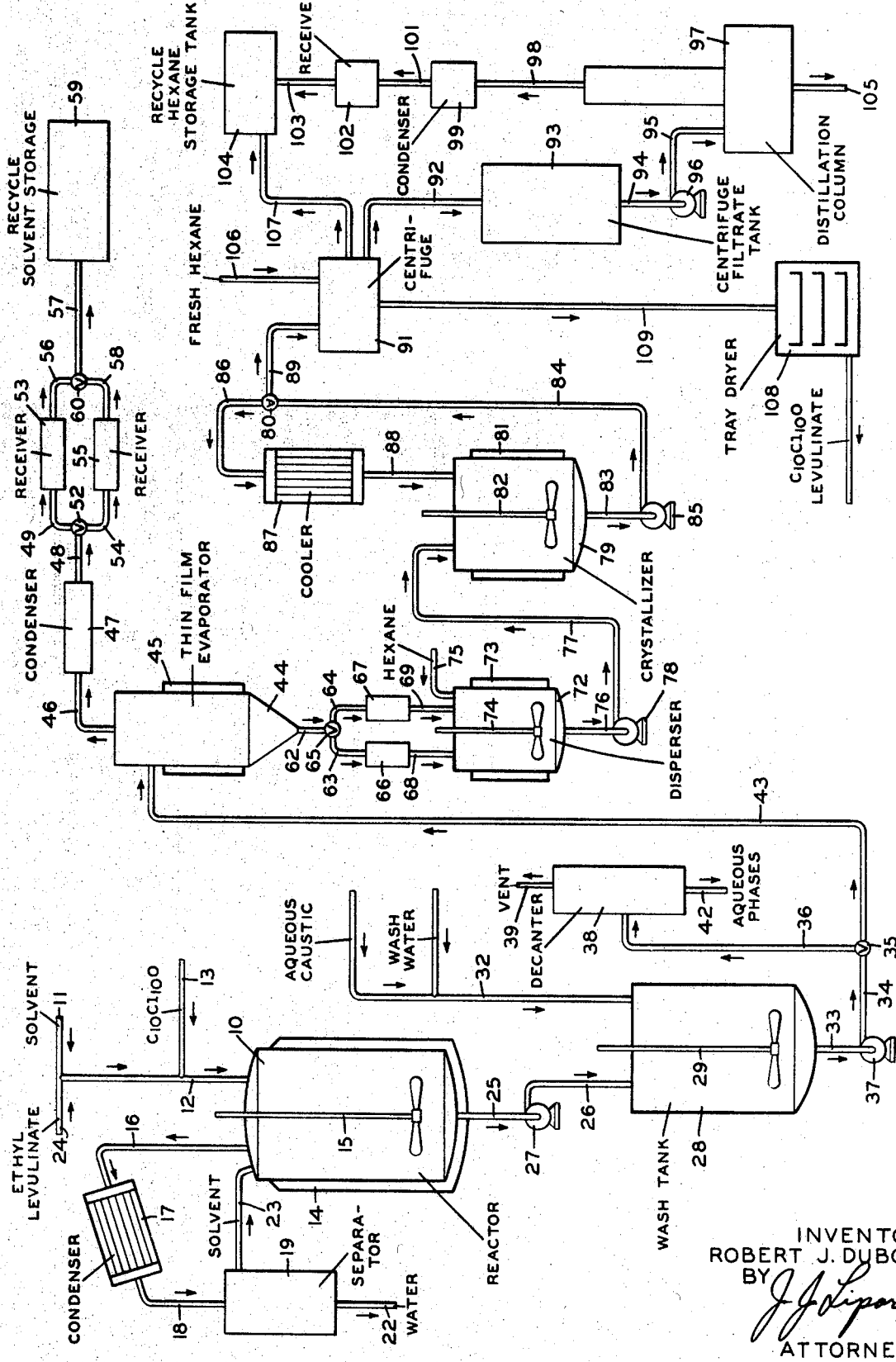

3,555,074
PROCESS FOR PRODUCING AN INSECTICIDE
Robert J. Du Bois, Morristown, N.J., assignor to Allied
 Chemical Corporation, New York, N.Y., a corporation
 of New York
Filed Dec. 26, 1967, Ser. No. 693,371
Int. Cl. C07c 69/74
U.S. Cl. 260—468                                    3 Claims

ABSTRACT OF THE DISCLOSURE

A process for producing a relatively high yield of decachlorooctahydro - 1,3,4 - metheno - 2H - cyclobuta[c,d]-pentalen-2-one ($C_{10}Cl_{10}O$) adducts which possess high purity and sharp melting points. In particular the $C_{10}Cl_{10}O$ ethyl levulinate adduct, $C_{10}Cl_{10}O$ levulinate, is produced by reacting decachlorooctahydro - 1,3,4 - metheno - 2H-cyclobuta[c,d]-pentalen-2-one with ethyl levulinate in a solvent at a temperature within the range of 55–250° C. The solution is then cooled to 10–100° C. and washed with an aqueous basic solution. The recovered $C_{10}Cl_{10}O$ levulinate is water washed until free of any alkali whereupon it is purified by crystallization. $C_{10}Cl_{10}O$ levulinate is an effective insecticide with low toxicity to animals and human beings at prescribed dosages.

RELATED APPLICATIONS

The present application is related to U.S. application, Ser. No. 604,149 which is directed to adducts of decachlorooctahydro - 1,3,4 - metheno - 2H - cyclobuta (c,d)-pentalen-2-one, hereinafter referred to as $C_{10}Cl_{10}O$, with alkylidene, cycloalkylidene and phenylene keto acids. This application disclosed the preparation of the ketone levulinate adduct by reacting ethanol with the $C_{10}Cl_{10}O$—levulinic acid adduct.

The present application is also related to U.S. application, Ser. No. 606,505, now Pat. No. 3,393,223 which is directed to the production of adducts by reacting $C_{10}Cl_{10}O$ with other ketones. This application disclosed the production of $C_{10}Cl_{10}O$-ethyl levulinate adduct, hereinafter referred to as $C_{10}Cl_{10}O$ levulinate, by reacting $C_{10}Cl_{10}O$ with ethyl levulinate. Broadly, the process includes the addition of a solvent, such as xylene, to $C_{10}Cl_{10}O$, the resultant mixture being refluxed to remove all the water. Ethyl levulinate is added to the solution and the mixture is again refluxed whereupon the solution is stripped of solvent and and the residue triturated with hexane to produce a $C_{10}Cl_{10}O$ levulinate having a melt point of 74–81° C. with a yield ranging from about 60–70%.

BACKGROUND OF THE INVENTION

This invention relates to a method of producing $C_{10}Cl_{10}O$- ketone adducts and, in particular, to a method of producing a high yield, relatively pure $C_{10}Cl_{10}O$ levulinate.

$C_{10}Cl_{10}O$ is a complex chlorinated polycyclic ketone having a molecular weight of 490.68. It is believed to be most accurately represented by the following cage structural formula:

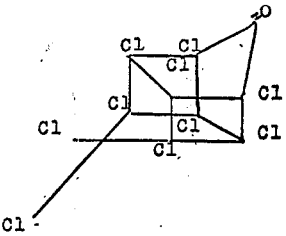

This ketone may be prepared in known manner by hydrolyzing the reaction product of hexachlorocyclopentadiene and sulfur trioxide. Heretofore, in the production of $C_{10}Cl_{10}O$—ketone adducts, the reaction was carried out by refluxing the reactants in a solvent such as xylene. The solvent was then removed by distillation to leave a crude $C_{10}Cl_{10}O$—ketone product which was purified by crystallization from hexane.

In the above prior process and in accordance with U.S. application, Ser. No. 606,505, $C_{10}Cl_{10}O$—ketone adducts can be prepared from ketones selected from the group consisting of:

(1) $RCH_2COR^1$ in which R is a member of the group consisting of hydrogen and methyl and $R^1$ is a member of the group consisting of alkyl, arylalkyl and aryl groups;

(2)

In which $R^2$ is a member of the group consisting of hydrogen and alkyl groups; and (3)

in which $R^3$ is a member of the group consisting of hydrogen and alkyl groups. Of this group of ketones, the present application is particularly concerned with ethyl levulinate for the production of $C_{10}Cl_{10}O$ levulinate by reacting $C_{10}Cl_{10}O$ with ethyl levulinate, according to the reaction:

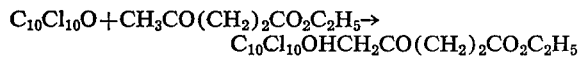

$C_{10}Cl_{10}O$ levulinate may be represented by the cage structural formula

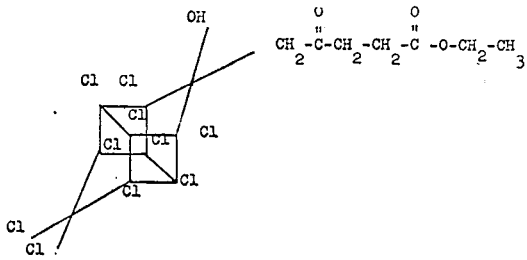

Under the prior process, the yield of the $C_{10}Cl_{10}O$ ketone adduct, particularly $C_{10}C_{10}O$ levulinate, generally was in the range of 50–75%; however, in order to obtain a yield of about 75% a reaction time of 48 hours or more was necessary. Furthermore, the $C_{10}Cl_{10}O$-ketone product and, in particular, the $C_{10}Cl_{10}O$ levulinate product obtained was relatively impure. Unless it is otherwise specified, percent refers to weight percent.

Obviously, it is desirable to prepare an insecticidal product of high assay, which is generally indicated by melting point. Pure $C_{10}Cl_{10}O$ levulinate melts at 91° C. Materials prepared according to the prior processes melted at a range of about 80–85° C. with 5° C. deviations. Attempts, without success, have been made to improve the prior art processes by using an excess of the raw materials reactants. Too high an excess of $C_{10}Cl_{10}O$ leads to $$C_{10}Cl_{10}O$$

contaminating the product and too high an excess of ethyl levulinate reduces the yield during the crystallization from hexane.

Accordingly it is an object of this invention to produce $C_{10}Cl_{10}O$ ketone adducts by a process which results in a high yield.

It is another object of this invention to produce $$C_{10}Cl_{10}O$$

levulinate of good quality and high yield.

It is an additional object of this invention to produce $C_{10}Cl_{10}O$ levulinate by a process in which the reaction time is substantially decreased over prior art processes.

SUMMARY OF THE INVENTION

In accordance with the present invention, $C_{10}Cl_{10}O$-ketone adducts are produced in at least 80% yield. The ketone is selected from the group consisting of:

(1) $RCH_2COR^1$ wherein R is a member selected from the group consisting of hydrogen and methyl and $R^1$ represents a member selected from the group consisting of unsubstituted alkyl groups containing 1 to 9 carbon atoms, arylalkyl groups in which the alkyl group contains 1 to 4 carbon atoms, carboalkoxyalkyl groups in which the alkyl contains 1 to 4 carbon atoms and the alkoxy contains 1 to 4 carbon atoms, carboxyalkyl groups in which the alkoxy contains 1 to 2 carbon atoms; phenyl and acetyl;

(2)

wherein $R^2$ is a member of the group consisting of hydrogen and alkyl radicals containing 1 to 3 carbon atoms; and (3)

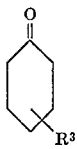

wherein $R^3$ is a member of the group consisting of hydrogen and alkyl radicals.

$C_{10}Cl_{10}O$ is added to a solvent and then a ketone, such as ethyl levulinate, is added to the solution, which is then refluxed at a temperature within the range of 55–250° C. After the refluxing period, the solution is cooled to 10–100° C. and washed with an aqueous basic solution maintained at 10–50° C. The $C_{10}Cl_{10}O$-ketone product is then recovered from the washed solution.

BRIEF DESCRIPTION OF THE DRAWING

The drawing is a schematic illustration of the invention according to a preferred embodiment of the process.

DESCRIPTION OF THE PREFERRED EMBODIMENT

In the preferred embodiment of the process disclosed below, the production of $C_{10}Cl_{10}O$-levulinate is obtained. However, it is understood that the production of any other $C_{10}Cl_{10}O$-ketone adduct may be obtained in a similar manner.

Referring to the drawing, a suitable aromatic hydrocarbon solvent, such as xylene, toluene or benzene which is inert to the reactants and desired ketone adduct, is introduced into reactor 10 through line 11 which passes into line 12 leading into reactor 10. $C_{10}Cl_{10}O$ containing about 5–15% water is then introduced into reactor 10 via lines 13 and 12. As will be seen, the solvent forms an azeotrope with the water in the $C_{10}Cl_{10}O$ for subsequent removal of the water therefrom. The weight ratio of the amount of solvent used to the amount of $C_{10}Cl_{10}O$ may be about 2:1. Reactor 10 is preferably glass-lined with heating jacket 14 and is provided with an agitator 15.

The water in the $C_{10}Cl_{10}O$ is removed by azeotropic distillation of the water-xylene azeotrope at a liquor temperature in the range of 90–140° C. In reactor 10, the vapor passes upwardly through line 16 into condenser 17 where the azeotrope is condensed into a liquid. The liquid then passes through line 18 into glass separator 19 where the aqueous and xylene layers separate out. The condensed aqueous layer is removed through line 22 and discarded. The condensed xylene layer is returned to reactor 10 through line 23. The distillation is continued until all the water present in the reactor is removed. It should be noted that although one reactor is used in the present description of the process, more than one reactor can be used in the process.

After the water is removed from reactor 10, ethyl levulinate is introduced into the reactor through lines 24 and 12. Generally 5–18% and preferably 5–10% of ethyl levulinate is added in excess of the amount necessary to react with the $C_{10}Cl_{10}O$. The reaction mixture is then continuously agitated generally for 8–30 hours and preferably for 8–24 hours. During the agitation of the reaction, the reaction mixture is refluxed at a temperature in the range of 55–250° C. and preferably at 130–155° C. After the reaction time has passed, the reaction mixture is cooled to 10–100° C. and preferably to 10–50° C.

The reaction mixture in reactor 10 is pumped through lines 25 and 26 by means of pump 27 into wash tank 28 which contains an agitator 29. After the reaction mixture is in the wash tank 28, an aqueous basic solution is added through line 32. Any inorganic basic soution may be used; however, an aqueous solution of sodium hydroxide, potassium hydroxide, or sodium carbonate is preferred. Generally the aqueous solution should be at a concentration of 0.1–20.0% and preferably 0.1–5.0% of the basic material. Furthermore, the basic solution should be generally at a temperature within the range of 10–100° C. and preferably 10–30° C. The reaction mixture is washed with the basic solution in tank 28 with agitation. Generally, the reaction mixture or solution is in a weight ratio with the basic solution of about 4:1 to 1:5 and preferably 2:1 to 1:3. The reaction mixture and aqueous basic solution are agitated for about 10–30 minutes and then an hour is allowed for separation of the organic layer from the aqueous layer. If a poor separation occurs, additional solvent is added to insure good separation. The aqueous layer is then pumped from wash tank 28 through lines 33, 34, 36, and valve 35 by means of pump 37 into decanter 38. Any gases present in the aqueous layer are vented to the atmosphere from the decanter 38 through line 39 and the aqueous layer is discarded through line 42. The solvent-product layer in tank 28 is then washed with water until it is free of the basic material used in the aqueous basic solution. The wash water is discarded through the decanter in a similar manner as explained for the initial wash. Then the solvent product layer is pumped through lines 33, 34, 43, and valve 35 by means of pump 37 into a continuous thin film evaporator 44 having a heating jacket 45 which operates under a pressure of 5–10 mm. mercury and at a bottoms temperature of 100–110° C. The solvent removed overhead through line 46 is condensed in condenser 47 and then it is passed alternatively through lines 48, 49, and valve 52 into receiver 53 or through lines 48, 54, and valve 52 into receiver 55. After each receiver is filled, the solvent is transferred through its respective lines 56, 57 and valve 60 or through lines 58, 57, and valve 60 into recycle storage tank 59 so that the recovered solvent may be used in the process again.

The bottoms from evaporator 44 containing the crude $C_{10}Cl_{10}O$ levulinate are passed alternatively through line 62 into dual lines 63, 64 via valve 65, the $C_{10}Cl_{10}O$ levulinate passing successively into preferably stainless steel receivers 66 and 67. After one receiver is filled, the crude product is transferred therefrom through its respective line 68 or 69 into a stainless steel dispersion vessel 72, the other receiver being filled during this time. The dispersion vessel 72 is provided with a jacket 73 and an agitator 74 and contains recycled hexane, heated at 60° C., which has been added to the vessel through line 75. The crude product is agitated with the hexane whereupon the resultant hexane mixture is then pumped through lines 76 and 77 by means of pump 78 into a stainless steel crystallizer 79 having a cooling jacket 81 and an agitator 82. The hexane-product mixture is cooled to 10–20° C. generally and preferably below 10° C. to precipitate out $C_{10}Cl_{10}O$ levulinate. The hexane product slurry is then pumped out of the crystallizer through lines 83 and 84 by means of pump 85, a portion of the slurry being recycled through valve 80 and line 86 for passage through cooler 87 where it is further cooled and then passed back into the crystallizer 79 through line 88. The remaining portion of the slurry is pumped through lines 84, 89 and valve 80 into a stainless steel basket centrifuge 91 wherein the product is recovered from the slurry. The hexane centrifugate is passed through line 92 into a receiving tank 93 whereupon it is transported through lines 94 and 95 by means of pump 96 to a distillation column 97 for purification. The distillate vapor passes from column 97 through line 98 into condenser 99 where it is condensed once then passed through line 101 into receiver 102. From receiver 102 the condensed hexane is passed through line 103 to the recycle hexane storage tank 104. The bottoms of column 97 are discarded through line 105.

The $C_{10}Cl_{10}O$ levulinate cake product in centrifuge 91 is washed with fresh hexane which enters the centrifuge through line 106. The product is washed at ambient temperature at a ratio of about 0.5 pound of hexane per pound of cake. The washed hexane is passed from the centrifuge through line 107 into the recycle hexane tank 104. The product cake is transferred from the centrifuge by conveying means 109 to a tray dryer 108 for drying the cake at a temperature of about 50° C. Alternatively a rotary drum or air dryer (not shown) can also be used for drying the product cake. The dried $C_{10}Cl_{10}O$ levulinate is then packaged in suitable containers.

The following example illustrates one method of carrying out the present invention and is not intended to limit the invention in any respect. All percents in the examples are in weight percent unless specified otherwise.

EXAMPLE I

Two 750-gallon glass-lined, jacketed reactors with agitators and condensers were used to produce 1,657 pounds $C_{10}Cl_{10}O$ levulinate per reactor. Each reactor was charged with 3,240 pounds xylene (450 gallons) and 1,500 pounds $C_{10}Cl_{10}O$ (100% basis). The $C_{10}Cl_{10}O$ contained 10 weight percent water. Prior to the reaction, this water was removed from the reaction mixture by azeotropic distillation at liquor temperatures ranging from 90 to 140° C. The water-xylene azeotrope was condensed and collected in a glass separator 1.5 feet in diameter by 8 feet long. The condensed layer was then removed from the bottom and discarded and the xylene layer returned to the reactor. Distillation was continued until all water present in the reactor was removed.

A total of 440 pounds of ethyl levulinate was next charged to each reactor. The reaction mixture was then agitated for about 20 hours at 140–145° C. The reaction mixture was cooled to 35° C. and pumped to a 1,600-gallon stainless wash tank equipped with an agitator.

A total of 700 gallons of 1 weight percent aqueous sodium hydroxide solution was charged to the 1,600-gallon wash tank containing the reaction mixture. The resulting mixture was agitated for 20 minutes and allowed to separate for about 1 hour. If a poor separation was obtained, additional xylene was added to insure good separation. The aqueous layer was removed and discarded. The xylene-product phase was then washed with sufficient water (in 700-gallon portions) until free of the sodium hydroxide. The aqueous phase was discarded after each wash.

The xylene-product mixture was then fed to a continuous thin-film evaporator operating under a pressure of 5–10 mm. mercury and bottoms temperature of 100–110° C. Xylene was removed overhead, condensed and collected in two 100-gallon stainless steel receivers. As each receiver was filled, the xylene was pumped to xylene recycle storage.

Bottoms from the evaporator containing the crude $C_{10}Cl_{10}O$ levulinate was collected in two 45-gallon stainless steel receivers. As each receiver was filled, the crude product was pumped to a 200-gallon stainless steel dispersion vessel containing about 115-gallon recycle hexane at 60° C. and the melt was dispersed in the hexane with agitation. The hexane mixture was then pumped to a 750-gallon stainless steel crystallizer. In all, 450 gallons of hexane were used for the crude $C_{10}Cl_{10}O$ levulinate obtained from one reactor charge. The hexane-product mixture was cooled to 10–15° C. to crystallize $C_{10}Cl_{10}O$ levulinate.

The hexane-product slurry was pumped to a stainless steel basket centrifuge where the product was recovered from the slurry. The $C_{10}Cl_{10}O$ levulinate cake was then washed with fresh hexane at ambient temperature at a ratio of 0.5 pound hexane per pound cake. The wash hexane was used as recycle. The hexane centrifugate was purified by distillation in a 10-plate, 1-foot diameter column and the condensate was collected in a 100-gallon receiver and pumped to recycle hexane storage. The column bottoms were discarded.

The wet $C_{10}Cl_{10}O$ levulinate cake from the centrifuge was dried at 50° C. in a tray dryer or a rotary drum dryer. The dried $C_{10}Cl_{10}O$ levulinate was then packaged in suitable containers. The $C_{10}Cl_{10}O$ levulinate was obtained in about 85% yield, based on starting $C_{10}Cl_{10}O$.

EXAMPLE II

The following equipment was used in the experiment: a 2 liter flask equipped with a paddle stirrer, a thermometer, a water cooled reflux condenser, and a Dean-Stark tube for collecting water. In order to carry out the process, 150 grams of $C_{10}Cl_{10}O$, 300 ml. xylene and 44.2 grams of ethyl levulinate were charged to the flask. The water-xylene azeotrope was distilled until all the water was removed from the flask. A total of 7 ml. of water were collected in 1½ hours. Then 143 grams of anhydrous $C_{10}Cl_{10}O$ and 44.2 grams of ethyl levulinate were ready for reaction in the xylene solvent. The amount of ethyl levulinate present was 5% in excess of the stoichiometric amount necessary to react with the $C_{10}Cl_{10}O$. The mixture was refluxed at 144° C. for 25 hours. After the refluxing period, the reaction mixture was cooled to room temperature and stirred with 300 ml. of 2% sodium hydroxide for 15 minutes. The lower caustic aqueous layer was drawn off from the organic layer. Then the upper organic layer (xylene and $C_{10}Cl_{10}O$ levulinate) was washed twice with 300 ml. portions of water forming two aqueous layers. Subsequently the lower caustic aqueous layer and two aqueous layers were combined and washed with 300 ml. of xylene whereupon the combined aqueous layers were separated out. The initial organic layer and the resultant organic layer obtained with the xylene were combined and charged to a Rinco evaporator. In the evaporator, xylene and residual water were removed. The bottoms from the evaporator were mixed with hexane and then the product was precipitated from the hexane to give a relatively pure $C_{10}Cl_{10}O$ levulinate product which was air dried overnight. The first crop of crystals from the hexane weighed 146.4 grams and melted at 89.5 to 90.5 C. A second crop of crystals was obtained from the hexane which weighed 21.5 grams and melted at 88–89° C. The overall yield was 91% on the basis of the $C_{10}Cl_{10}O$ charged.

The illustrations of the method that constitutes the invention given above are not intended to limit the invention in any way but are merely descriptive of the method. All modifications which fall within the spirit of the present invention are claimed as part of the present invention.

What is claimed is:
1. A process of producing decachloroctahydro-1,3,4-methena-2H-cyclobuta[c,d]-pentalen-2-one ethyl levulinate adduct in at least 80% yield comprising:
   (a) adding decachlorooctahydro - 1,3,4 - metheno-2H-cyclobuta[c,d]-pentalen-2-one to a solvent selected from the group consisting of xylene, toluene and benzene, to form a solution;
   (b) adding ethyl leuvlinate to the solution in an amount of 5–18% in excess of the stoichiometric amount necessary to react with the decachlorooctahydro - 1,3,4 - metheno - 2H - cyclobuta[c,d]-pentalen-2-one;
   (c) refluxing the solution at a temperature within the range of 55–250° C. for 8–30 hours;
   (d) cooling the reaction solution to 10–100° C.;
   (e) washing the reaction solution with an aqueous basic solution containing 0.1–20% of a basic material selected from the group consisting of sodium hydroxide, potassium hydroxide and sodium carbonate, at 10–50° C., thereby forming an aqueous layer and an organic layer, the weight ratio of the reaction solution to the basic solution varying from 4:1 to 1:5;
   (f) drawing off the aqueous layer;
   (g) washing the organic layer with water and drawing off the water;
   (h) removing all solvent from the organic layer by distillation so as to provide a residue product; and
   (i) mixing the residue product with hexane to remove any impurities therein to form the desired adduct.

2. The process of claim 1 wherein the decachlorooctahydro - 1,3,4 - metheno-2H-cyclobuta[c,d]-pentalen-2-one contains 5–15% water which is removed by azeotropic distillation before the addition of the ethyl levulinate.

3. A process for producing the decachlorooctahydro-1,3,4 - metheno-2H-cyclobuta-[c,d]-pentalen-2-one ethyl levulinate adduct in at least 85% yield comprising:
   (a) adding decachlorooctahydro - 1,3,4 - metheno-2H-cyclobuta[c,d]-pentalen-2-one to xylene in a reactor to form a solution;
   (b) boiling off the water present in the solution;
   (c) adding ethyl levulinate to the solution in an amount of 5–15% in excess of the stoichiometric amount necessary to react with decachlorooctahydro-1,3,4-metheno-2H-cyclobuta-[c,d]-pentalen-2-one;
   (d) refluxing the solution at a temperature within the range of 130–155° C. for 4–24 hours;
   (e) cooling the reaction solution to 10–50° C.;
   (f) washing the reaction solution with an aqueous solution of 0.1–5.0% sodium hydroxide maintained within the temperature range of 10–30° C. to form an aqueous layer and organic layer, the weight ratio of the reaction solution to the sodium hydroxide solution varying from 2:1 to 1:3;
   (g) drawing off the aqueous layer;
   (h) washing the organic layer with water and drawing off the water;
   (i) removing the xylene from the organic layer by distillation so as to leave a residue product; and
   (j) mixing the residue product with hexane to precipitate out a substantially pure residue adduct.

References Cited

UNITED STATES PATENTS 3,393,223   7/1968   Lombardo _____ 260—468

OTHER REFERENCES

Craig et al.: "Technique of Org. Chem.," Weissberger, editor, 1956, pp. 150, 302.

LORRAINE A. WEINBERGER, Primary Examiner

R. GERSTL, Assistant Examiner

U.S. Cl. X.R.

260—514, 586, 590